United States Patent [19]

Eshoo

[11] 4,262,864
[45] Apr. 21, 1981

[54] SOLAR BALLOON MANEUVERING SYSTEM

[76] Inventor: Fredrick Eshoo, 151 Kakh Ave., Tehran, Iran

[21] Appl. No.: 20,549

[22] Filed: Mar. 14, 1979

Related U.S. Application Data

[63] Continuation-in-part of Ser. No. 860,711, Dec. 15, 1977, Pat. No. 4,174,082.

[51] Int. Cl.³ .................................................. B64B 1/58
[52] U.S. Cl. ...................................... 244/31; 126/425; 244/96
[58] Field of Search .................... 244/31, 33, 29, 30, 244/96, 97, 168, 171, 51; 126/425

[56] References Cited

U.S. PATENT DOCUMENTS

| | | | |
|---|---|---|---|
| 1,677,688 | 7/1928 | Rees | 244/29 |
| 1,877,003 | 9/1932 | Meng | 244/51 |
| 3,220,671 | 11/1965 | Ashman et al. | 244/31 |
| 3,337,162 | 8/1967 | Bauserman | 244/31 |
| 3,565,368 | 2/1971 | Byron | 244/31 |
| 4,082,947 | 4/1978 | Haywood et al. | 126/425 |
| 4,174,082 | 11/1979 | Eshoo | 244/31 |

OTHER PUBLICATIONS

Malpas, *Aerostat*, Aug. 1974, p. 154, "Harnessing Solar Radiation".
*Ballooning Magazine*, vol. 3, No. 1, Winter 1973/1974, pp. 9–17.
Barnes "First Flight of the Solar Firefly" Aerostat, Dec. 1973, pp. 4, 6 and 7.
Chappell, "Solar Balloon Flights", Aerostat, Apr., 1975, p. 307.
Cameron Balloon catalog, 9/1977, back page.
Croker, "Harnessing Superheat", Aerostat, Apr., 1974, p. 47.

*Primary Examiner*—Charles E. Frankfort
*Attorney, Agent, or Firm*—Hill, Van Santen, Steadman, Chiara & Simpson

[57] ABSTRACT

A solar powered hot air balloon with a maneuvering system is disclosed. The balloon is formed of an envelope with an opaque portion and a transparent portion arranged so as to utilize solar heating to heat air within the envelope. The opaque portion of the envelope has a substantially black inner surface and a light reflecting outer surface with the black inner surface being positioned so as to receive a maximum amount of sunlight through the transparent portion for a given location of the sun. Ascent and descent maneuvering is accomplished by changing the rotational position of the balloon relative to the position of the sun so that more or less portions of the black inner surface receive sunlight to thus generate heating within the envelope. The maneuvering system includes a pair of propulsion units positioned on opposite sides of the balloon. In one embodiment, two light sensors may be provided which are connected to a control unit. The control unit either manually or automatically selectively activates the propulsion units depending upon the amount of light received by the respective sensor units. In another embodiment, a plurality of light sensors are spaced around the balloon at angular increments. Respective pairs of sensor elements are activated corresponding to desired angles of rotational position for the balloon so that the amount of sunlight received by the inner block surface can be varied so as to control ascent and descent.

3 Claims, 10 Drawing Figures

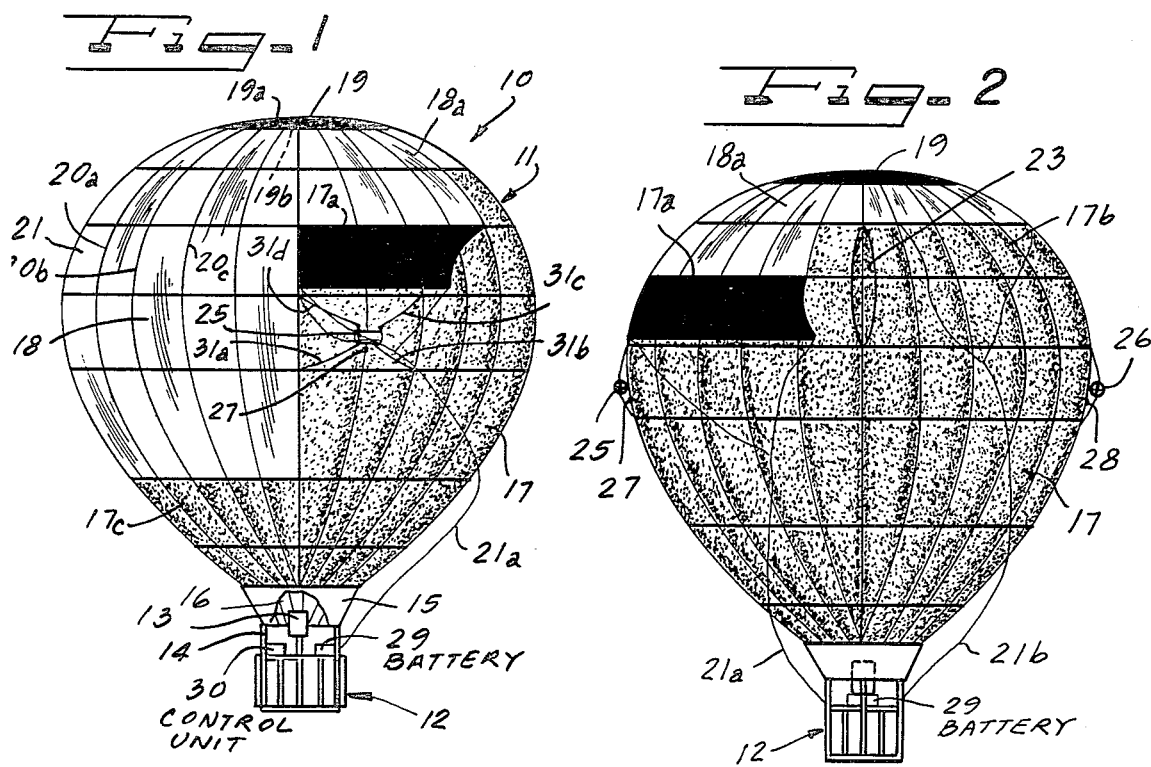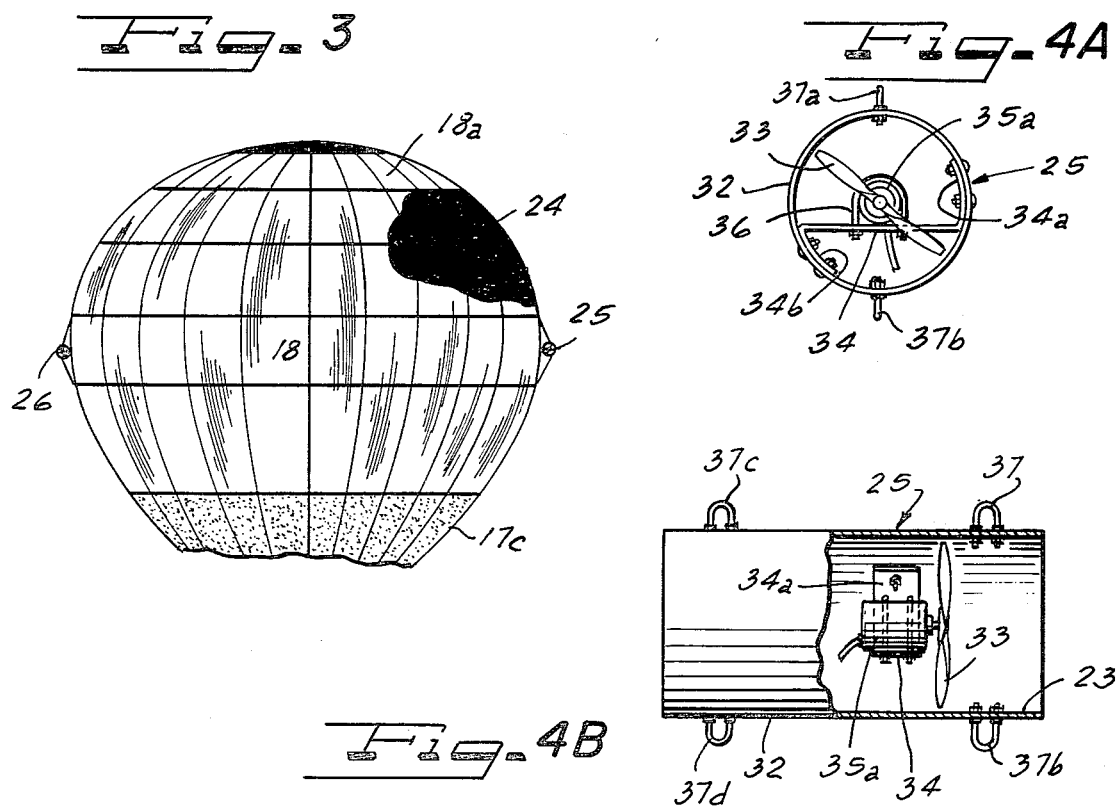

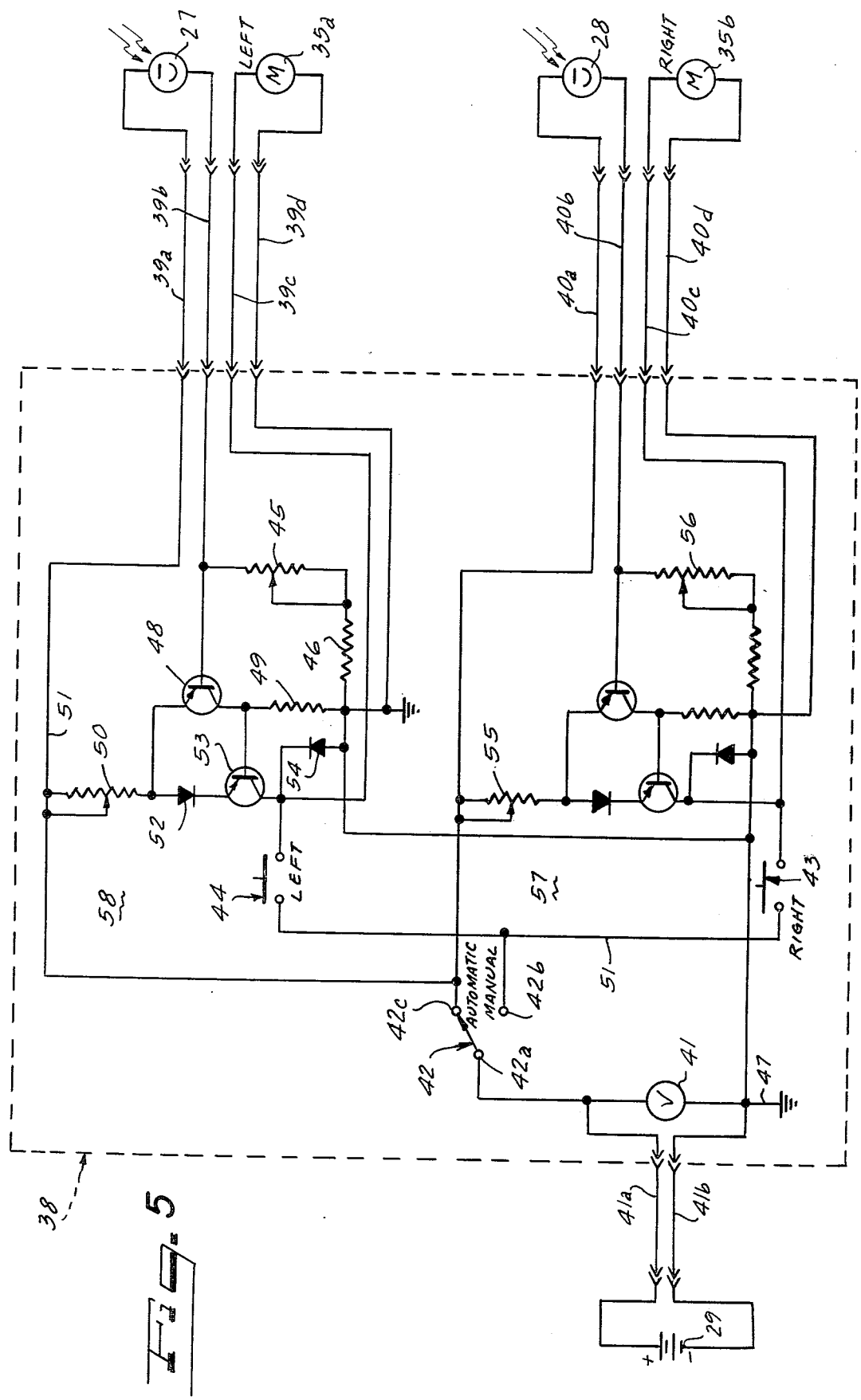

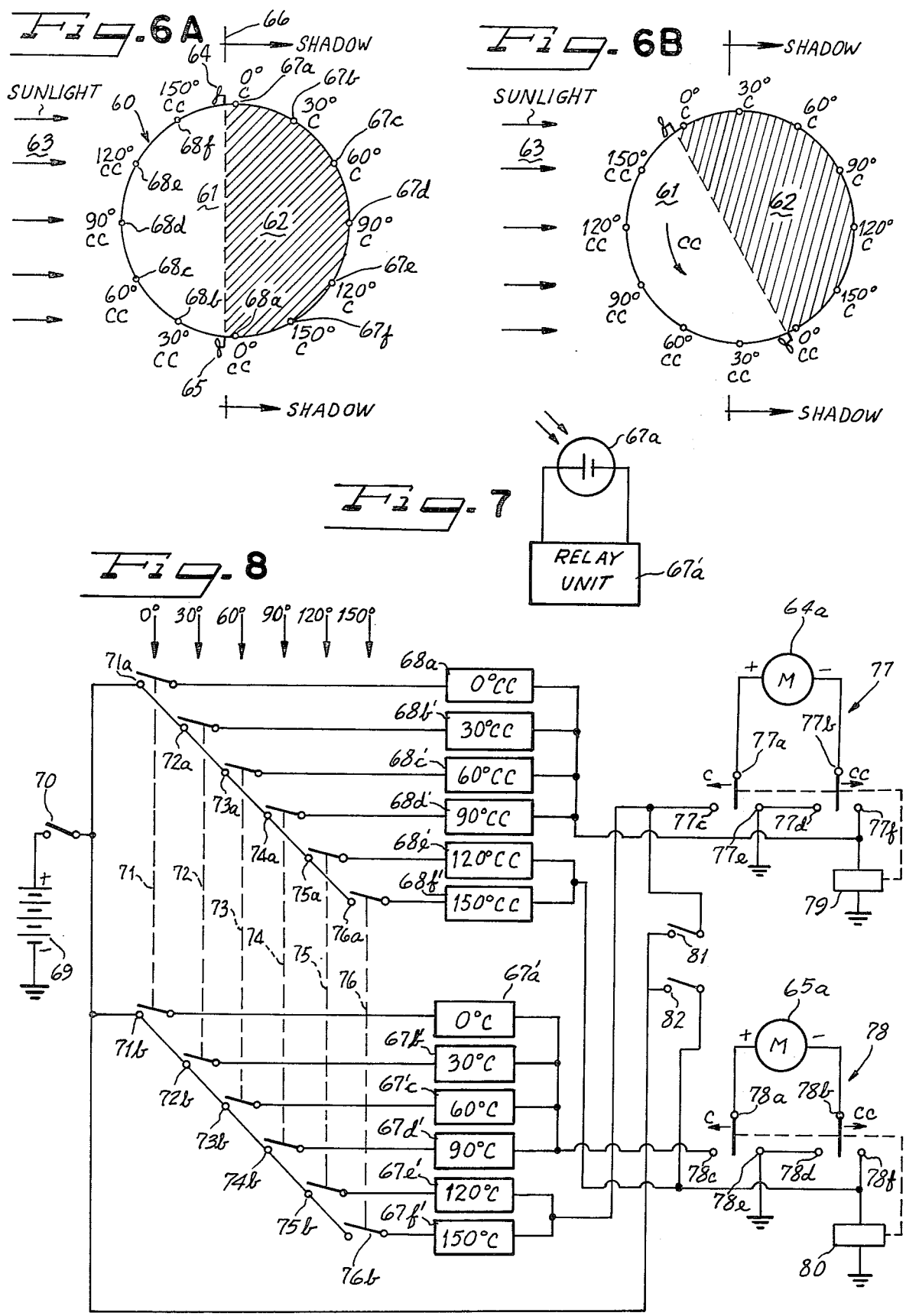

SOLAR BALLOON MANEUVERING SYSTEM

RELATED APPLICATION

This application is a continuation-in-part of my earlier filed co-pending application Ser. No. 860,711 filed Dec. 15, 1977, now U.S. Pat. No. 4,174,082.

BACKGROUND OF THE INVENTION

This invention relates to solar hot air balloons and more particularly to a maneuvering system for a solar hot air balloon.

Hot air ballooning has become an increasingly popular sport in recent years. In virtually all balloons, the hot air required for buoyancy is generated by a burner which uses propane as a fuel. Typical flight durations with these balloons are from one to two hours. However, by carrying a very heavy overload of fuel, a few flights over twelve hours have been possible. These long flights are for special record-breaking attempts and are not practical for the sport ballonist.

While relatively short flights of one or two hours may be acceptable to many balloonists, it would be most desirable to make longer flights as is commonly the case with gas balloons such as those containing hydrogen or helium. With gas balloons, typical flight durations are more in the range of five to fifteen hours. To make hot air balloons fly, it is necessary to heat air within the balloon sufficiently so that the mass of internal air is less than the mass of the surrounding air by an amount equal to the mass of the balloon and its load. In addition to heating the air with propane or other sources of fuel, it has been known to use solar energy to heat balloons. It is a natural consequence of flying during sunlight hours that some energy will be absorbed by the balloon skin, particularly if it is dark colored, making some contribution toward heat build up. In most cases this is trivial or insignificant.

In my co-pending application Ser. No. 860,711 a solar powered hot air balloon is disclosed having an envelope with an opaque portion and a transparent portion. The opaque portion has a substantially black inner surface which is positioned so as to receive a maximum sunlight radiated through the transparent portion. With such a solar powered hot air balloon, the internal heating of the air within the envelope is dependent upon the rotational position of the envelope about its vertical axis relative to the position of the sun. When the transparent portion faces directly towards the sun, maximum heating occurs.

SUMMARY OF THE INVENTION

It is an object of the present invention to provide a hot air balloon having a transparent portion and an opaque portion arranged to utilize solar heating of air within the envelope, and wherein a maneuvering system is provided for ascent and descent maneuvering by changing the rotational position of the hot air balloon about its vertical axis.

It is a further object of this invention to control ascent and descent of a solar powered hot air balloon by rotating the balloon to permit more or less solar heating of an inner blackened surface opposite a transparent portion of the envelope of the hot air balloon.

It is another object of this invention to provide an automatic and manual control system for maintaining a preset rotational position of the balloon relative to the sun.

It is a further object of this invention to provide a maneuvering system for a solar powered hot air balloon wherein the maneuvering system utilizes propulsion units of relatively small size and power requirements.

According to the invention, a solar powered hot air balloon is provided having a maneuvering system for ascent and descent by use of rotational position of the balloon about a vertical axis relative to level flight. The balloon has an envelope with a highly translucent portion and an opaque portion. The opaque portion has a substantially light absorbing inner surface within the envelope which is positioned so as to receive a substantial portion of sunlight passing through the translucent portion. A maneuvering system is provided for rotating the balloon about a vertical axis relative to level flight to control the amount of sunlight received by the light absorbing inner surface. The maneuvering system includes at least one propulsion unit on a side of the envelope. The control unit is provided for selectively activating the propulsion unit to turn the balloon about its vertical axis. At least two propulsion units are provided disposed on opposite sides of the envelope. The control unit selectively activates either of the two propulsion units in response to sunlight received on corresponding light sensing devices also connected to the control unit. In one preferred embodiment, a plurality of light sensing devices are disposed in spaced relationship around the envelope. Angular positions of the light sensing devices correspond with angular rotational positions of the envelope which can be automatically maintained by the maneuvering system.

The propulsion unit preferably comprises an electric motor which is connected to drive a small propeller. The propeller is mounted within a cylindrical tube for creating a defined airflow stream from airflow as created by the propeller.

BRIEF DESCRIPTION OF THE DRAWINGS

FIG. 1 is a side view of the solar powered hot air balloon maneuvering system of this invention;

FIG. 2 is a rear view of the balloon of FIG. 1;

FIG. 3 is a front view of the balloon of FIG. 1;

FIG. 4A is a front view of a propulsion unit of the maneuvering system illustrated in FIG. 1;

FIG. 4B is a side view with a cut-away portion illustrating the propulsion unit of FIG. 4A;

FIG. 5 is a schematic diagram of electronic circuitry utilized in the solar powered hot air balloon maneuvering system of this invention;

FIG. 6A is a simplified diagrammatic top view of the solar powered hot air balloon illustrating an embodiment of the invention in which a plurality of light sensors are provided around an equator of the balloon;

FIG. 6B is similar to FIG. 6A except that the balloon has been rotated counterclockwise with respect to a given sunlight direction;

FIG. 7 is a diagram of the light sensor and relay unit used with the embodiment shown in FIG. 6A; and FIG. 8 is a schematic diagram of circuitry used in the embodiment illustrated in FIG. 6A.

DESCRIPTION OF THE PREFERRED EMBODIMENTS

The solar powered hot air balloon and maneuvering system of this invention is generally shown at 10 in FIG. 1. A balloon envelope 11 is provided having a substantially circular cross-section with respect to a vertical axis. The envelope 11 supports a gondola 12 by use of gondola supports 14 and envelope support cables 16. A hot air generating system which, in one preferred embodiment, comprises a burner 13 may be counted on the gondola or on the envelope for supplying hot air to supplement air heated by solar energy. A skirt 15 may be provided directly above the gondola 12. This skirt shelters the burner 13 from excessive wind currents and improves the overall efficiency of operation of the burner 13.

The envelope 11 consists of an opaque portion 17 having a light reflecting outer surface and an opaque black light absorbing inner surface 24 as shown most clearly in FIG. 3. The opaque portion 17 in one preferred form of the invention constitutes approximately one half of the total balloon area. A base portion 17c of the opaque portion surrounds the base of the balloon. Upper edges of the opaque portion 17 are separated from a top cap 19 of the balloon by a circular portion of transparent material 18a. Also along the upper edge of the opaque portion 17 are provided first and second curtains 17a and 17b which are attached to a curtain control line 21a or 21b. Velcro strips sewn along upper and side edges of the curtains attach the curtains to the transparent portion 18. By pulling on the control lines 21a or 21b, the curtains can be pulled free to increase the radio of transparent portion area to opaque portion area adjacent a top part of the balloon. Consequently, if the sun is directly overhead or nearly overhead, additional sunlight may enter the balloon through the uncovered transparent portions.

The envelope 11 may be constructed in known manner by use of gores 21 joined at seams 20a, 20b, 20c for example. A top cap 19 may be provided over the top of the balloon having an outwardly facing opaque surface 19a and an inner light reflecting surface 19b.

As shown in FIG. 2, a maneuvering vent 23 may be provided along an upper backside of the balloon.

Referring to FIG. 3, when viewing the balloon from the front side which corresponds to the preferred entry of light rays from the sun, it can be seen that the sunlight passes through the frontal transparent portion 18 so as to strike the opaque surface 24 at the back of the balloon. Here, the curtain 17a is in the up position.

The maneuvering system of the solar powered hot air balloon will now be discussed in detail referring to FIGS. 1, 2 and 3. A first propulsion unit 25 and a second propulsion unit 26 are mounted at or near the equator of the envelope 11 but substantially on opposite sides thereof. Mounting cords 31a, b, c, d may be utilized to secure the first and second propulsion units 25 and 26 to one of the gores of the balloon. The propulsion units are posiioned so as to direct a stream of air in horizontal fashion and along a line which is substantially a tangent on the surface of the envelope.

By positioning the two propulsion units in this fashion, maximum torque may be created by the propulsion units for rotational movement of the balloon envelope about its vertical axis.

Also illustrated in FIGS. 1 and 2 are first and second sensors 27 and 28 which are preferably light sensing devices for sunlight but which could also be heat sensing devices. The sensors 27 and 28 are preferably mounted on the envelope at a variety of positions. Generally, when the balloon is in a given position relative to the sun, one of the light sensors will be shaded by portions of the envelope while the other light sensor will be exposed to sunlight. However, a rotational position can be assumed by the balloon wherein neither sensor receives light. This is achieved by mounting the sensors slightly less than 180° apart. In one preferred embodiment, the light sensor 27 is arranged adjacent the propulsion unit 25 and the other light sensor 28 is positioned adjacent the propulsion unit 26.

On the gondola 12 a battery 29 is provided along with a control unit 30.

Referring now to FIGS. 4A and 4B, the first propulsion unit 25 is shown which is preferably identical to the second propulsion unit 26. The propulsion unit 25 is formed of a hollow cylinder 32 for creating a jet stream of air. A propeller 33 is mounted on the shaft of a direct current electric motor 35a within the cylinder 32. A mounting bracket 34 having curved mounting arms 34a and 34b is centrally positioned within the cylinder 32. The motor 35a is bolted to the mounting bracket 34 by use of mounting straps 36 preferably in the form of U-bolts. Mounting hooks 37a, b, c, d are provided on the cylinder 32 for use with the mounting cords 31a, b, c, d which mount the propulsion unit to the envelope.

Preferably the propellers create a jet stream of air by pushing air out the cylinder 32. By operating only one propulsion unit at a time, maximum efficiency can be obtained by use of propellers which push the air. The direct current motor 35a is preferably about one-fourth horsepower and is excited by the battery 29. One-half horsepower is generally a maximum amount of power necessary with the maneuvering system of this invention due to the large distance between the propulsion unit and the center of the envelope. Furthermore, the propeller 33 need be only 10" long and have two blades such as a standard model airplane propeller. Preferably, the propeller may rotate at 10,000 RPM.

Referring now to the schematic diagram of FIG. 5, the maneuvering system control circuitry 38 is illustrated. The direct current motors 35a and 35b of the propulsion units 25 and 26 connect via plug input connecting cables 39a, b, c, d and 40a, b, c, d to the control circuitry 38. The battery 29 may also be provided external to the control circuitry 38 by use of connecting cables 41a and 41b.

The control unit circuitry comprises a volt meter 41 connected across the battery input leads 41a and 41b. The negative side of the battery 29 is connected to a reference 47 and the positive side of the battery 29 connects to a function switch 42 at contact 42a. The function switch has an automatic position 42c and a manual position 42b. The automatic position 42c has a contact which supplies power to a left channel or section 58 and a right channel or section 57. In the manual position 42b, battery voltage is supplied to manual momentary contact switches 43 or 44 respectively located in the right and left channels. The momentary contact switches 43 and 44 respectively connect to motors 35b or 35a.

The left and right channels are substantially identical and consequently only the left channel will now be described. In the left channel or section 58, one side of the light sensing detector 27 which is preferably a photo-cell connects with B+ at 51. The other side of the sensor 27 connects to a base of transistor 48. The base also connects to ground through a threshold adjustment resistor 45 and fixed resistor 46. The collector of transistor 48 connects through a resistor 49 to the reference potential and the emitter connects to B+ through a second threshold setting resistor 50. The junction of the emitter of transistor 48 and the variable resistor 50 connects to the anode of a diode 52 whose cathode connects to an emitter of a transistor 53. A base of the transistor 53 connects to the collector of transistor 48 and the collector of transistor 53 connects through a diode 54 to the reference potential. The manual momentary contact switch 44 also connects to the collector of transistor 53.

Operation of the solar hot air balloon maneuvering system of this invention will now be described. When the function switch 42 is in the manual position, by depressing either the right momentary contact switch 43 or the left momentary contact switch 44, the right propulsion unit 26 or the left propulsion unit 25 may be selectively activated so as to cause the balloon to rotate about its vertical axis. If ascent is desired, the appropriate propulsion unit will be activated to position the balloon for maximum heating, that is with a maximum area of the inner surface exposed to sunlight received through the transparent portion. To stabilize the balloon in a desired position, the switches 43 and 44 may be periodically depressed.

To descend, the air within the balloon is cooled by changing the rotational position of the balloon so that less sunlight is received on the inner dark surface and consequently less heating occurs.

With the function switch 42 in the automatic position, a predetermined or desired rotational position of the balloon may be automatically maintained. In this regard, the threshold level controls 45 and 50 in the left channel or section 58 and the threshold controls 56 and 55 in the right channel or section 57 are adjusted. One of the controls are adjusted for sensitivity to the light received so that the propulsion units are automatically activated when light level changes occur corresponding to undesirable rotations of the balloon away from a predetermined rotational position. The other control in each channel is used for balancing.

Another embodiment of the invention is illustrated in FIGS. 6A through 8. As shown in FIG. 6A, a simplified version of the balloon envelope 60 viewed from the top can be considered as having a translucent portion 61 which normally faces so as to receive sunlight from direction 63. The opaque portion 62 faces substantially away from the sunlight. A shadow will be created rearwardly of the line 66 given the sunlight direction 63 illustrated. A first group of light sensors such as photocells are arranged at 67a-f at substantially equal angular increments along the equator of the balloon on the opaque portion 62. For instance, the light sensors may be positioned at 0° C., 30° C., 60° C., 90° C., 120° C. and 150° C. The letter "C" represents a clockwise rotation of the balloon. Usage of these symbols will become clear below. Similarly, a second group of photo-cells 68a-f are provided with photo-cell or light sensors 68a on the opaque portion 62 and the remaining light sensors on the translucent portion 61. These photo-cells are labeled 0° C.C, 30° C.C, 60° C.C, 90° C.C, 120° C.C, and 150° C.C. Similarly, these light sensors are also spaced at substantially equal angular increments. It is of particular interest to note that the light sensors at 0° C. and 0° C.C are spaced slightly less than 180° around the opaque portion 62 so that when the translucent portion 61 directly faces sunlight 63, both of the light sensors will be shaded. However, a small rotation of the balloon will cause one of the light sensors to become exposed to sunlight.

As in the embodiment of the invention shown in the earlier figures, first and second propulsion means 64 and 65 are provided at opposite sides of the envelope. Preferably these propellers are positioned at the transition point from the opaque portion 62 to the translucent portion 1. The propulsion units 64 and 65 are preferably propellers driven by DC motors 64a and 65a.

The balloon of FIG. 6A is shown in FIG. 6B except that it has been rotated counterclockwise and is approaching a rotation increment of 30°. As this rotation occurs, it is noted that the light sensor labeled 30° C.C and the light sensor labeled 30° C. both become shadowed whereas shortly before reaching the 30° rotation point, the light sensor 30° C.C was exposed to sunlight.

As shown in FIG. 7, the light sensors are preferably a solar cell such as shown at 67a which connects with a relay unit 67a' of a commercially available type which can be directly activated by the output from a solar cell.

In FIG. 8, the control circuitry for the system illustrated in FIGS. 6A and 6B is shown. This control circuitry includes a plurality of the relay units of the type shown in FIG. 7.

As illustrated in FIG. 8, a battery 69 has one terminal grounded and the other terminal connected through an on/off switch 70 to a common bus line connecting with one of the terminals of each section of two section switches 71, 72, 73, 74, 75 and 76. Each of the switches 71 through 76 corresponds to an approximate rotational position of the balloon desired to be automatically maintained. Sections 71a through 76a of the switches 71 through 76 have their other terminals connecting to relay units 68a' through 68f'. Similarly, switch sections 71b through 76b connect to relay units 67a' through 67f.

Relay units 68a' through 68d' are commonly connected to a terminal 77f of a reversing switch relay 77. Relay units 68e' and 68f' commonly connect to a terminal 78f of another reversing switch relay 78. Relay units 67a' through 67d' commonly connect to a terminal 78c of the reversing relay switch 78 and relay units 67e' and 67f commonly connect to a terminal 77c of the reversing switch relay 77. The switch portion of the reversing switch relays 77 and 78 comprise DPDT switches each having six terminals. Terminals 77d and 77e of switch 77 and 78d and 78e of switch 78 are connected together. The central terminals 77a and 77b respectively connect to the plus and minus terminals of DC motor 64a. Similarly, the plus and minus terminals of motor 65a connect with the central terminals 78a and 78b of the relay switch 78. Terminals 77e and 78e in the respective switch relays are grounded and the relay coils 79 or 80 connect with respective terminals 77f or 78f. Manual operation switches 81 and 82 are also provided. One end of each of these switches is commonly connected to the plus terminal of the battery 69 and the other side of the switches respectively connect to terminals 77c and 78f of the switching relays 77 and 78.

Operation of the maneuvering system shown in FIGS. 6A through 8 will now be described. If the balloon is positioned as shown in FIG. 6A, light sensors 0° C. and 0° CC. will both be shaded. Consequently, if switch 71 is activated, the relay units 0° C. and 0° CC. will both be open. Consequently, the relay 77 is off and the relay is switched to connect terminals 77c and 77d. Since no voltage is present at terminal 77c, the motor will not operate. Similarly, reversing switch relay 78 will connect the motor to terminals 78c and 78d. However, there is no voltage present at 78c and consequently the motor 65a will not operate. If, for example, the balloon were to rotate slightly such that the light sensor 0° C. becomes exposed to sunlight, relay unit 0° C. will close and voltage will be applied to the motor 65a. This will cause the balloon to rotate clockwise thus forcing the light sensor 0° C. back into the shade. Similarly, if light sensor 0° C.C becomes exposed to sunlight, the relay unit 0° C.C will close so as to activate relay 79 and apply positive voltage to the negative terminal of the motor 64a. This will cause motor 64a to drive in a reverse direction and turn the balloon in a counterclockwise direction so as to place the sensor 0° C.C back in the shade. Consequently, the terminology "0° C.C" indicates that whenever this light sensor becomes exposed to sunlight, a counterclockwise rotation of the balloon is required to place it back in the shade. If the light sensor 0° C. becomes exposed, a clockwise rotation of the balloon is desired and consequently the term "0° C." indicates a clockwise rotation.

If it is desired to cause the balloon to descend, internal heating of the hot air within the balloon must be reduced. Consequently, an operator of the balloon might activate switch 72 corresponding to a 30° rotational positional position of the balloon. When this occurs, the system will automatically rotate the balloon 30° counterclockwise and automatically maintain the balloon in this position in a fashion similar to the explanation of FIG. 6A. Manual override switches 81 and 82 are also provided so that the operator of the balloon may manually activate either of the DC motors 64 and 65a.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A solar hot air balloon having a maneuvering system for ascent and descent, comprising:
   (a) an envelope;
   (b) a gondola suspended from the envelope;
   (c) a highly translucent portion of the envelope;
   (d) an opaque portion of the envelope, said opaque portion having a substantially light absorbing inner surface within the envelope positioned so as to receive a substantial portion of sunlight passing through the translucent portion;
   (e) maneuvering system means for rotating the balloon about a vertical axis relative to level flight for controlling the amount of sunlight received by said light absorbing inner surface and for controlling ascent and descent;
   (f) said maneuvering system means comprising a first propulsion means disposed on a side of the envelope; and
   (g) said maneuvering system means including at least four light sensors positioned in spaced relationship around the balloon and circuitry means for simultaneously activating only two of said light sensors for automatically maintaining the balloon at a rotational position associated with the activated light sensors, said two sensors being positioned on opposite sides of the envelope.

2. The balloon of claim 1 wherein the at least four sensors are positioned substantially along an equator of the balloon and at least one of the sensors is positioned on the translucent portion of the envelope.

3. A solar hot air balloon having a maneuvering system for ascent and descent, comprising:
   (a) an envelope;
   (b) a gondola suspended from the envelope;
   (c) a highly translucent portion of the envelope;
   (d) an opaque portion of the envelope, said opaque portion having a substantially light absorbing inner surface within the envelope positioned so as to receive a substantial portion of sunlight passing through the translucent portion;
   (e) maneuvering system means for rotating the balloon about a vertical axis relative to level flight for controlling the amount of sunlight received by said light absorbing inner surface and for controlling ascent and descent;
   (f) said maneuvering system means comprising a first propulsion means disposed on a side of the envelope; and
   (g) said maneuvering system means including a first light sensor positioned on the opaque portion of the envelope and adjacent a junction of the opaque and translucent portions, a second light sensor positioned on the opaque portion opposite the first sensor on the opposite side of the envelope, a third light sensor on the opaque portion, and a fourth light sensor opposite the third sensor on the translucent portion of the envelope.

* * * * *